March 30, 1926.
A. O. AUSTIN
1,578,252
HOLDER FOR CABLES OR THE LIKE
Filed March 1, 1923 2 Sheets-Sheet 1
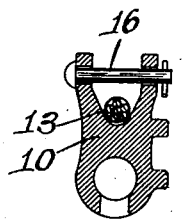
Fig.4
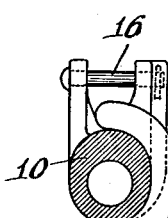
Fig.5
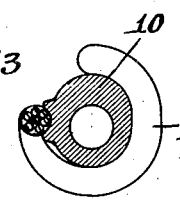
Fig.6
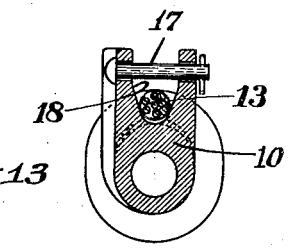
Fig.7
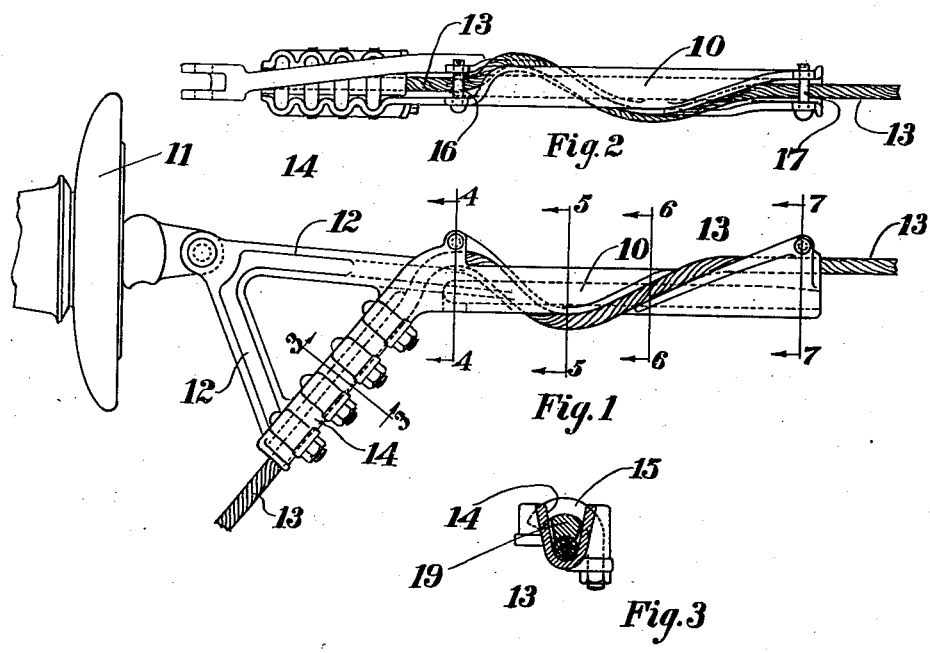
INVENTOR
Arthur O. Austin
BY
Nissen & Crane
ATTORNEY March 30, 1926.
A. O. AUSTIN
1,578,252
HOLDER FOR CABLES OR THE LIKE
Filed March 1, 1923
2 Sheets-Sheet 2
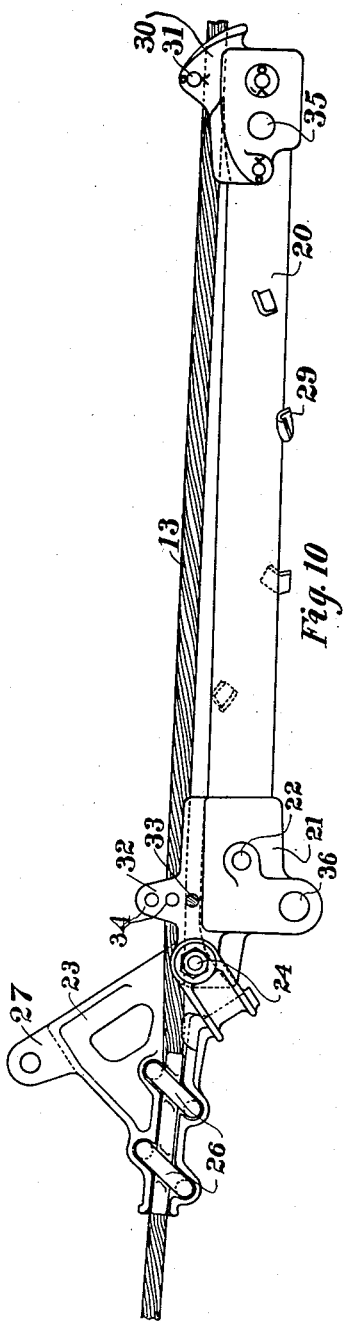
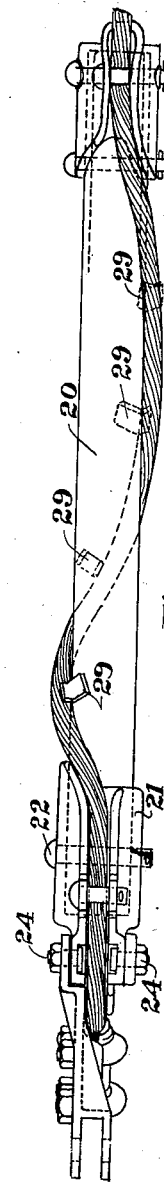
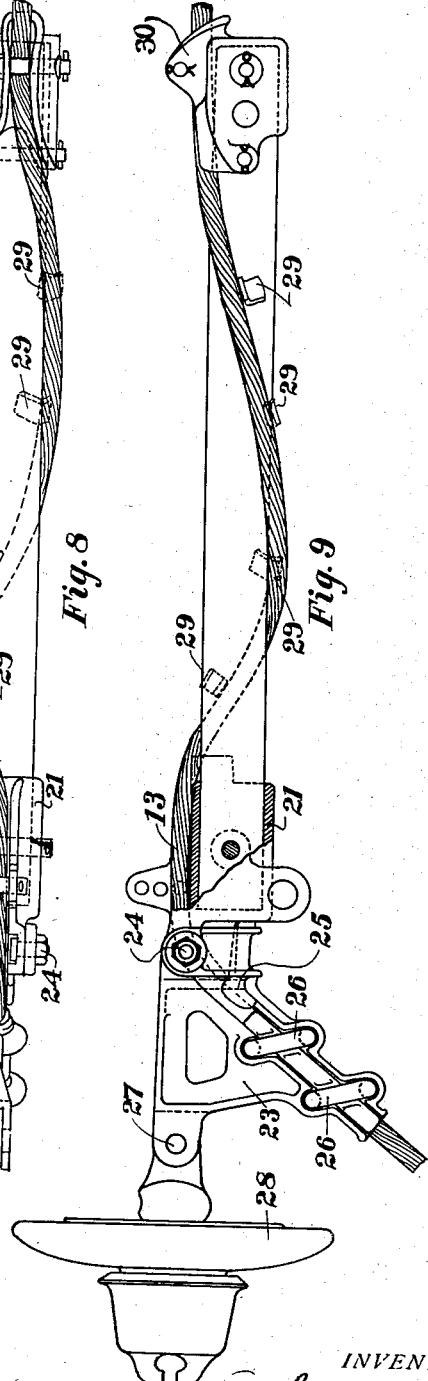
INVENTOR
BY Arthur O. Austin
Visser & Crane
ATTORNEY Patented Mar. 30, 1926.

1,578,252

UNITED STATES PATENT OFFICE.

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

HOLDER FOR CABLES OR THE LIKE.

Application filed March 1, 1923. Serial No. 621,973.

*To all whom it may concern:*

Be it known that I, ARTHUR O. AUSTIN, a citizen of the United States, residing in Barberton, county of Summit, State of Ohio, have invented certain new and useful Improvements in Holders for Cables or the like, of which the following is a specification.

This invention relates to holders or clamps for securing cables, conductor wires, or like members to supports therefor, and has for its object the provision of holders of the class named which shall be economical to manufacture, easy to install, efficient in operation and which shall minimize the danger of injury to the supported cable.

The invention is exemplified in the combination and arrangement of parts shown in the accompanying drawings and described in the following specification, and it is more particularly pointed out in the appended claims.

In the drawings—

Fig. 1 is an elevation of a cable holder embodying one form of the present invention.

Fig. 2 is a top plan view of the device shown in Fig. 1.

Fig. 3 is a section on line 3—3 of Fig. 1.

Fig. 4 is a section on line 4—4 of Fig. 1.

Fig. 5 is a section on line 5—5 of Fig. 1.

Fig. 6 is a section on line 6—6 of Fig. 1.

Fig. 7 is a section on line 7—7 of Fig. 1.

Fig. 8 is a top plan view of a somewhat modified form of the invention.

Fig. 9 is an elevation of the clamp shown in Fig. 8.

Fig. 10 is an elevation similar to Fig. 9 showing a position of the parts while installing the clamp.

Where electric conductor cables of high strength are used, it is often very difficult to hold the same without damaging the conductor, or to hold them securely enough so that the ultimate strength of the cable may be obtained.

In the present invention the conductor or cable is held at comparatively small cost by using friction set up by the tension in the conductor or cable. As this friction or tension is largely proportional to the tension or load on the cable, the conductor does not need to be gripped tightly at low tensions. This is an advantage, as where the cable is gripped too tightly it frequently happens that the strands are damaged, which may cause parting of the cable later, or which will make relocation of the clamp impossible without repairing or splicing the conductor.

The features of the clamp are of particular advantage in gripping high tension conductors such as are used in high voltage transmission lines. These conductors may have a soft outer core, such as aluminum or copper, and a high strength inner steel core.

In the ordinary type of clamp it is very difficult to secure a firm grip on the high strength inner core without removing the same from the outer layers of the conductor and gripping independently. This independent gripping is a decided disadvantage, for the high strength conductor is exposed to the weather and may rust and weaken the strength of the cable. This is particularly true where high voltages are used, as acids may be formed by the electrical discharge.

In the case of an aluminum conductor having a galvanized steel core, the relative location of the aluminum, steel and the galvanizing on the steel core are such that the aluminum will protect the galvanizing and the steel core so long as the aluminum is outside of the core. It is therefore a decided advantage to be able to grip a conductor of this kind without removing the core and exposing the same to the weather for if the core is exposed it may be damaged, thus limiting the life of the conductor. Protection of the steel core is important since the greater part of the strength of the conductor may depend upon the steel core.

Where the steel core is brought out, it may have to be painted or protected in some manner to prevent rusting and in addition the cost of bringing out a steel core and gripping separately is considerable.

Where the steel core is brought out separately the clamp cannot be relocated without splicing the conductor. With the improved type of clamp this difficulty is removed. The clamp may be used for dead ending high tension transmission lines and when made in proper form, may be used for tensions in either direction, such as at suspension supports and semianchor supports. The principles of the clamp also apply to anchors or dead ends for guys and elsewhere.

The clamp as made up has a main body portion 10 which is attached to the insulator 11 or point of support by the arms 12. The conductor 13 is placed in the main grip seat 14 and held down by the clamping or gripping bolts 15. The clamp is then given a motion so as to wrap the conductor in place so that it will have a spiral path around the snubbing member 10. After the conductor is in place the pins 16 and 17 may be slipped in place so as to prevent the conductor coming out of the seat.

Since the snubbing grip depends upon the tension in the conductor and the radius of curvature of the snubbing portion thereof, it is very important that the snubbing be on the free end of the conductor, that is on the portion of the conductor toward the load from the point where the conductor is clamped. This permits lighter gripping action by the grip bolts and a lighter and cheaper clamp since the force of the load is chiefly overcome by the snubbing action before it is transmitted to the clamp.

If the radius of curvature in the seat is too small the inner core in a reinforced cable will tend to cut thru the soft outer layers. In the form of clamp shown, the radius of curvature is readily controlled by changing the pitch of the conductor around the snubbing member 10. The pitch will be very steep where the conductor enters, so as to reduce the curvature and prevent the high strength inner core cutting thru the outer soft layers. As the tension is taken up by the tubular member 10, however, there will be less tension in the cable and a smaller radius of curvature may be used, increasing the snubbing friction for a given length of clamp.

The scheme proposed permits of easy curves where the tension is highest and an increase in the snubbing without complicating the construction of the clamp or making same unnecessarily large. It is evident that the snubbing member may be simply a pipe member attached to the main body or may be an integral part of the main body casting. The conductor may be held in position by any suitable form of guides or simply by the seat 18 in the end which will prevent the conductor from unwinding. The snubbing member may be made up with a pipe having several seat pieces which may be adjusted on same so that the radius of curvature may be changed for different size conductors, or this portion may be a twisted section which will provide a groove.

The general principles of the clamp embodies a clamp portion 19 and a snubbing portion on the span side so as to increase this primary grip by the development of frictional forces set up by the tension in the conductor. As the snubbing friction increases very rapidly with the angle of snubbing, it is important that the snubbing angle be made large without producing an undue pressure between the cable and clamp so as to cause damage as explained above.

A common fault in previous clamps is that no provision is made for the reduction in size of conductor when the elastic limit is approached or exceeded. In this invention a large part of the grip may be produced by snubbing, hence the tension in the conductor at the point of primary grip may be comparatively low, so that there will be no tendency for the conductor to decrease in size and lose its grip under the main grip bolts. It is evident that a reduction in the section thru the snubbing portion will not appreciably affect the gripping or holding power of the clamp, as the coefficient of friction would not be affected by same and the pressure with developed friction furthermore depends on the tension in the cable.

In the form of the invention in Figs. 8, 9 and 10, a pipe or bar 20 extends into a socket member 21 in which it may be held against rotation by a pin 22 or other suitable holder. A frame 23 is pivoted to the socket member 21 by means of bolts 24. The frame 23 is provided with a seat 25 for receiving the cable 13 and with U-bolts 26 for clamping the cable against the frame. An eye 27 is attached to the frame 23 by means of which the entire holding device may be connected with an insulator 28 or other suitable support. A series of abutment lugs 29 are arranged in helical formation on the pipe 20 so that the helix outlined by the lugs will increase in angularity relative to its axis from the load end of the pipe toward the end held in the socket 21. At the load end of the pipe a seat 30 is provided for receiving the cable and directing it on to the pipe in approximately the direction of the load on the cable.

In connecting the cable to its support by means of the clamp shown in Figs. 8, 9 and 10, the cable is placed in the seat 30 and the pin 31 inserted in place to prevent escape of the cable. At the opposite end of the clamp the cable is directed thru ears 32 and held in spaced relation to the pipe 20 by a pin 33, which may be inserted in any one of a plurality of holes 34. This holds the cable in position so that as it is rotated, the lugs 29 adjacent the seat 30 will engage the cable first and the lugs adjacent the socket 21 will pass beneath the cable until the cable is drawn down toward the pipe 20 by being wound upon the pipe. The end of the cable at the left of the clamp as shown in Fig. 10 is held by a come-along, or other suitable means and extends loosely thru the clamps by the bolts 26. The pin 22 is removed from the socket and the pipe 20 is rotated by means of a bar placed in the hole 35, or by other suitable means. The socket member 21 may be held against rotation by a bar extending thru a hole 36. As the pipe 20 is rotated the cable will be wound about the pipe, being directed by the abutment lugs 29. When the proper amount of rotation is secured, the pin 22 is reinserted in place the grip bolts 26 tightened and the frame 23 swung downwardly from the position shown in Fig. 10 to that shown in Fig. 9. The eye 27 is then attached to the insulator 28, or other support, and the clamp will then be in position to receive the load when the extended end is released from the come-along.

I claim:

1. The combination with a cable, of a holder therefor, comprising an elongated bar about which the cable is helically wound to provide a snubbing action thereon, and an elongated clamping member arranged at an angle to said bar for holding the snubbed end of the cable.

2. A holder for cables comprising an elongated member having a grooved seat at one end thereof for receiving the lead end of the cable in substantially the direction of the load thereon, guides for directing said cable in a helical curve about said member, the pitch of the helix being graded to provide an increasing snubbing action and a clamping member for holding the snubbed end of the cable arranged at an angle to the axis of said helix.

3. A holder for cables comprising an elongated member having a seat at one end thereof for receiving the cable in substantially the direction of the load, guides for directing said cable about said member in a helical curve of decreasing pitch, a clamp arranged at an angle to said member for holding the snubbed end of the cable, arms connected to said clamp and snubbing member respectively and an insulator to which said arms are attached for supporting said cable and holder.

4. A holder for cables, comprising a clamping member and a snubbing member, said snubbing member being rotatable relative to said clamping member to wind a portion of the cable thereon.

5. A holder for cables comprising a clamping member, having a bar connected therewith and rotatable relative thereto for winding the cable to be held about said bar, and means for securing said bar to said clamp to prevent unwinding of the cable.

6. In combination a clamping member, a bar connected therewith and rotatable relative thereto, arranged to extend in the direction of a cable to be held, a seat on said bar for receiving the load end of the cable so that when said cable is in place in said seat and said bar is rotated relative to said clamp the cable will be wound about the bar in a helical direction, and means for securing said bar against rotation relative to said clamp.

7. In combination a clamping member having a socket therein, a bar having one end thereof rotatably mounted in said socket, and having a seat at the opposite end for receiving the load end of a cable, and guides on said bar for directing said cable in helical formation when said bar is rotated in its seat.

8. A cable holder comprising a socket member having a clamp pivoted thereon, means for securing said clamp to a support, a bar rotatably mounted in said socket member, a cable seat secured to said bar at the end thereof opposite said socket member, means for holding a cable in spaced relation to the bar adjacent said socket member when said cable is connected to said clamp and positioned in said seat, abutment members on said bar for directing said cable in helical formation about said bar when said bar is rotated in its socket, the pitch of the helix decreasing from said seat toward said socket member and means for holding said bar against rotating in its socket.

9. The method of applying a grip member to a taut cable wherein said cable is engaged at one position by said grip member and said grip member rotated about its longitudinal axis and relatively to said cable to wind said cable thereupon.

10. The method of attaching a clamp to a taut cable wherein said clamp is connected to said cable at one position thereon and arranged along said cable in the direction thereof, the clamp being rotated about an axis in the direction of the cable to cause the cable to be wound spirally upon said clamp.

11. The method of attaching a clamp to a taut cable wherein said clamp is arranged to extend along the cable and connected at one position to said cable, the clamp and cable being relatively rotated about an axis in the direction of the length of the cable and the cable wound helically on the clamp at a pitch which progressively varies as the cable is wound about the clamp.

12. The method of attaching a clamp to a taut cable wherein an elongated member is arranged to extend in the direction of the cable and connected with the cable at the load end thereof, the clamping member and cable being rotated relatively to one another about an axis extending in the direction of the cable to cause the cable to wind helically on the clamping member the pitch of the helix decreasing as the winding progresses, the part away from the load end of the cable being positively connected to said clamping member subsequent to the winding operation to hold the cable from unwinding and to supplement the snubbing action of the elongated clamping member.

13. The method of securing a clamp to a taut cable wherein an elongated snubbing member and a positive clamping member are arranged adjacent the cable, the cable wound upon the elongated member after which the positive clamping member is moved relative to the elongated member to bend the cable at an angle, the relative movement being such that no stretching of the cable between the two members is produced thereby.

14. The method of securing a clamp to a taut cable wherein the cable is wound helically upon an elongated member and secured to a positive clamping member movably connected to said elongated member, the movable clamping member being then attached to a load support and shifted relative to said elongated member to bend the positive clamp end of the cable relative to the helical portion, the bending being produced without stretching the cable between said portions.

15. A clamp having a positive grip member and a snubbing grip member, said snubbing grip member having means for holding a cable in curved position thereon, the curvature of said cable being varied along the length thereof to compensate for varying tension therein so as to effect a substantially continuous bearing pressure of said cable on said snubbing member.

In testimony whereof I have signed my name to this specification on this 24th day of February, A. D. 1923.

ARTHUR O. AUSTIN.